Figure 1:
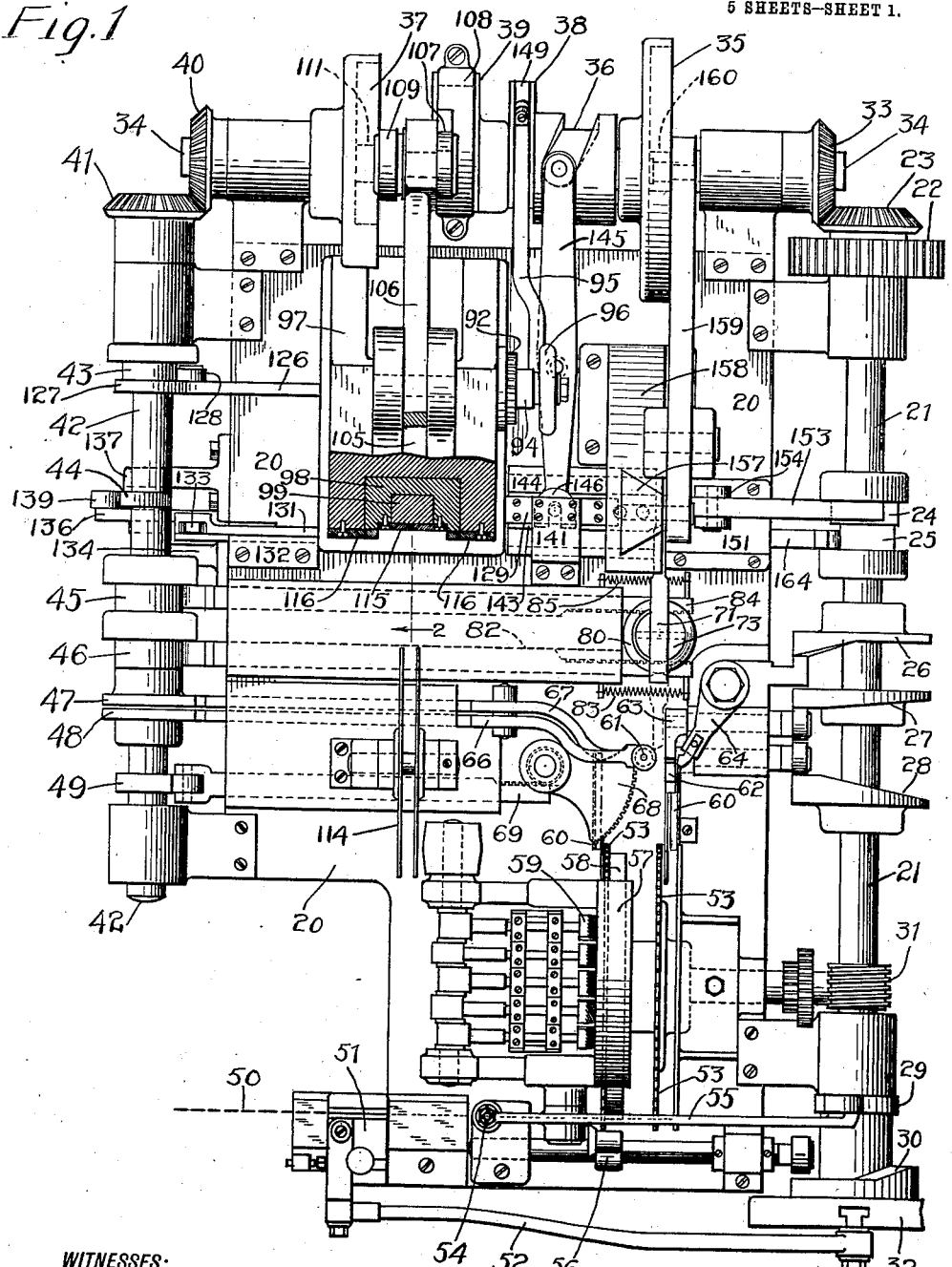

E. S. INGRAHAM.
MACHINE FOR MAKING SAFETY PINS.
APPLICATION FILED NOV. 16, 1912.

1,082,873.

Patented Dec. 30, 1913.
5 SHEETS—SHEET 1.

WITNESSES:
H. W. Meade
S. W. Atherton

INVENTOR
Edwin S. Ingraham
BY
A. M. Wooster
ATTORNEY

E. S. INGRAHAM.
MACHINE FOR MAKING SAFETY PINS.
APPLICATION FILED NOV. 16, 1912.

1,082,873.

Patented Dec. 30, 1913.

5 SHEETS—SHEET 2.

WITNESSES:
H. W. Meade
S. W. Atherton

INVENTOR
Edwin S. Ingraham
BY
A. M. Wooster
ATTORNEY

E. S. INGRAHAM.
MACHINE FOR MAKING SAFETY PINS.
APPLICATION FILED NOV. 16, 1912.
1,082,873.
Patented Dec. 30, 1913.
5 SHEETS—SHEET 3.
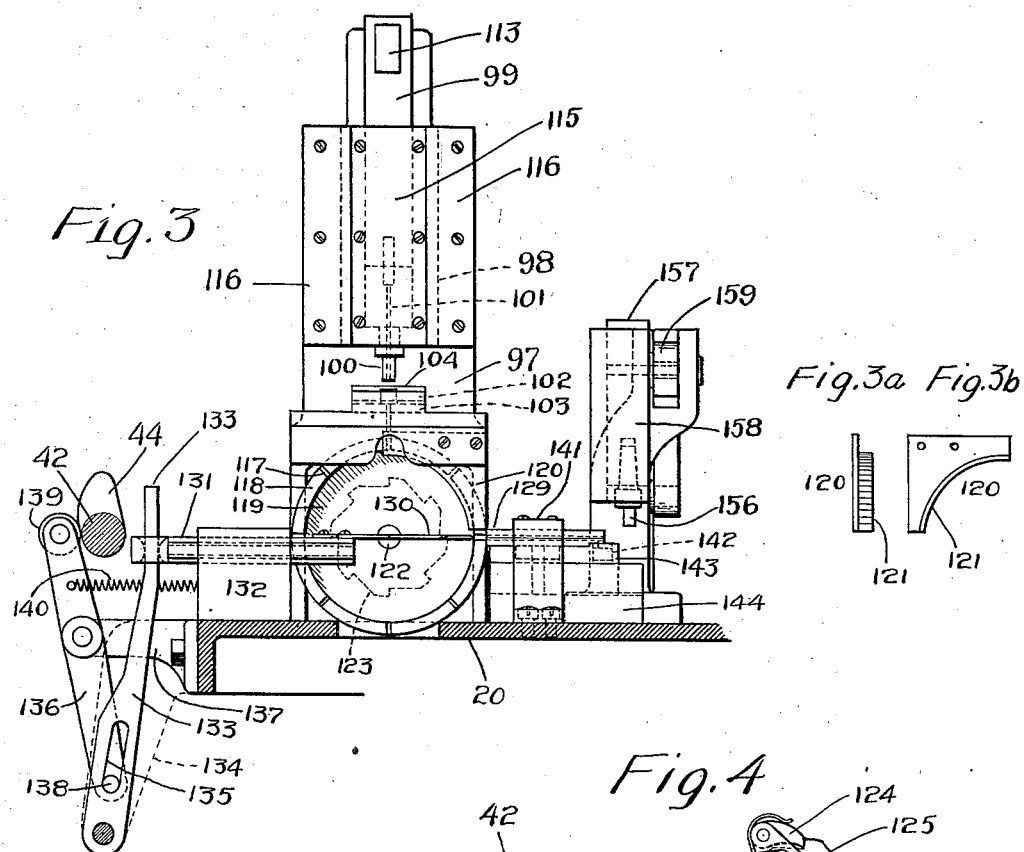
WITNESSES:
H. W. Meade
S. W. Atherton
INVENTOR
Edwin S. Ingraham
BY
N. M. Brooster
ATTORNEY E. S. INGRAHAM.
MACHINE FOR MAKING SAFETY PINS.
APPLICATION FILED NOV. 16, 1912.
1,082,873. Patented Dec. 30, 1913.
5 SHEETS—SHEET 4.
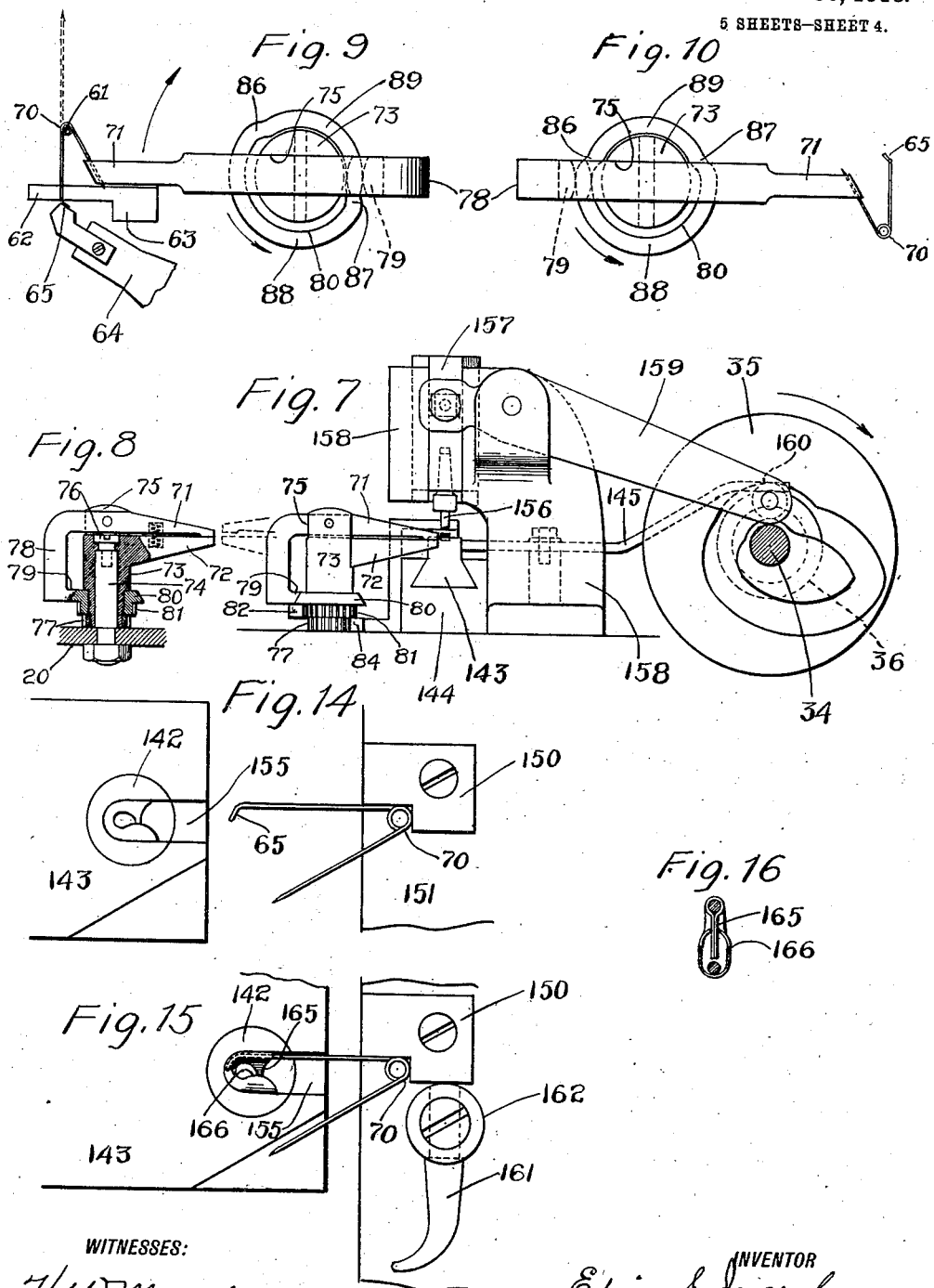

E. S. INGRAHAM.
MACHINE FOR MAKING SAFETY PINS.
APPLICATION FILED NOV. 16, 1912.
1,082,873.
Patented Dec. 30, 1913.
5 SHEETS—SHEET 5.
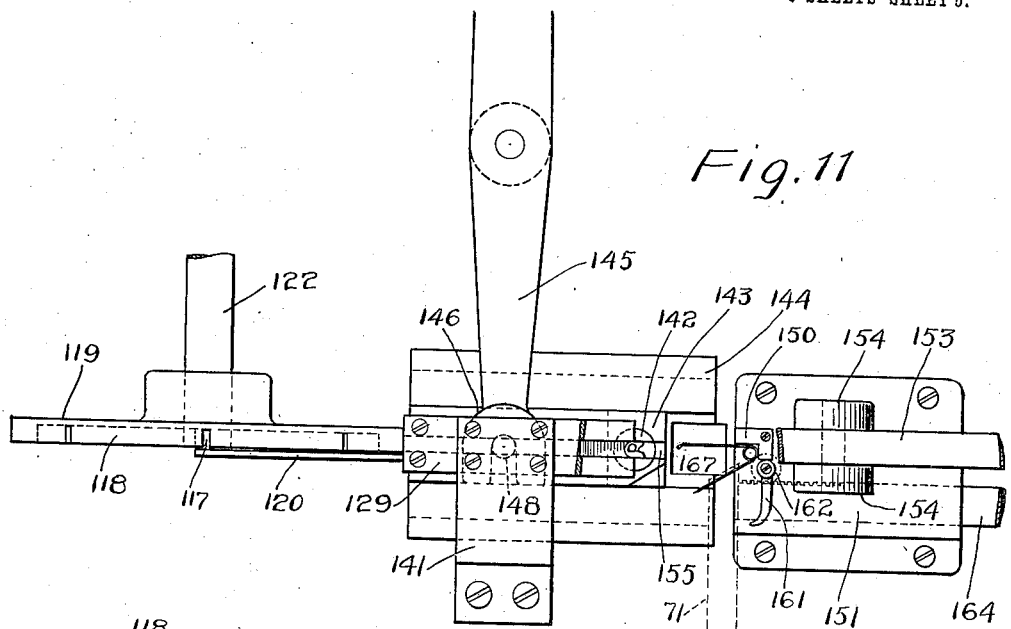
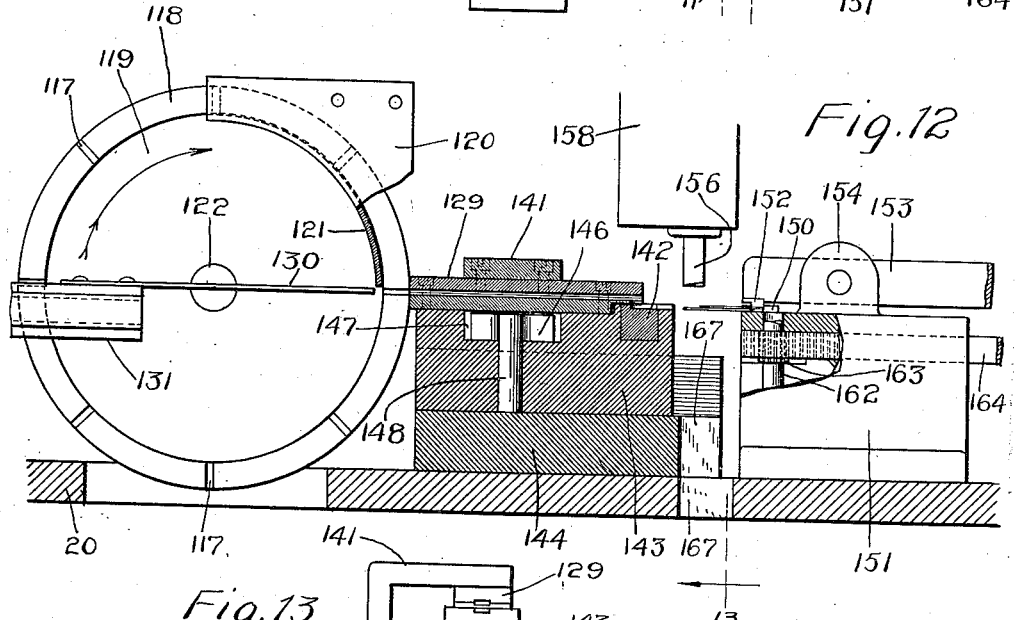
WITNESSES:
INVENTOR
Edwin S. Ingraham
BY
ATTORNEY

UNITED STATES PATENT OFFICE.

EDWIN S. INGRAHAM, OF OAKVILLE, CONNECTICUT.

MACHINE FOR MAKING SAFETY-PINS.

1,082,873.  Specification of Letters Patent.  Patented Dec. 30, 1913.

Application filed November 16, 1912. Serial No. 731,808.

*To all whom it may concern:*

Be it known that I, EDWIN S. INGRAHAM, a citizen of the United States, residing at Oakville, county of Litchfield, State of Connecticut, have invented an Improvement in Machines for Making Safety-Pins, of which the following is a specification.

This invention relates to the manufacture of that class of safety pins in which the guard, by which the point of the pin is retained in the closed position, is formed from sheet metal and attached by swaging to the unpointed end of the pin, and the invention has for its object to provide a compact, rapid, thoroughly reliable and relatively inexpensive machine for making complete safety pins automatically by a continuous series of operations; that is a machine which will form the pins from wire, blank out and form the guards from sheet metal, assemble the pins and guards and place the pointed arm of the pin in engagement with the guard.

Heretofore, so far as I am aware, the guards have been formed by an independent machine and fed to a pin making machine or else the guards have been attached to the pins by a manually operated press. My novel machine saves numerous operations, avoids any handling of the pins and guards and produces complete safety pins much faster and at very much less expense than has heretofore been possible. So far as my present invention is concerned, it is immaterial what special form of pin making machine is used, the gist of the invention lying in the mechanisms for making the guards, assembling the pins and guards and swaging the guards to the pins.

For the purposes of this specification I will use the term "safety pin" as referring to the completed article with the guard in place, the term "pin" as referring to the wire portion of the completed article, and the term "guard" as referring to the sheet metal portion of the completed article.

Figure 2:
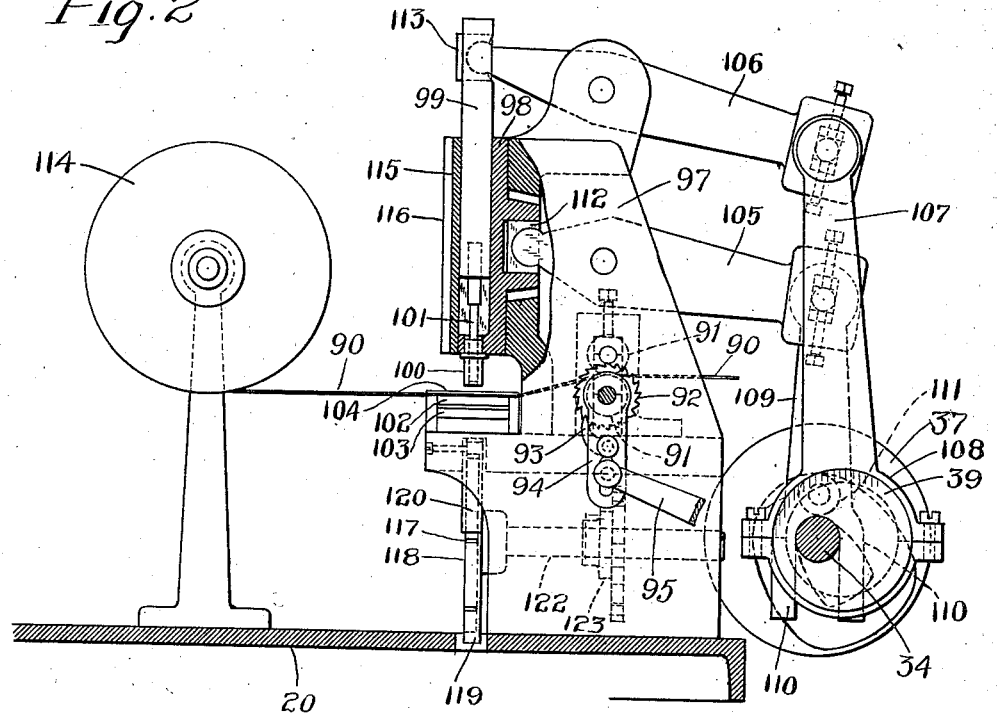

In the accompanying drawings forming a part of this specification in which similar reference characters indicate the same parts in all the views, Figure 1 is a plan view of the machine complete, the guard blanking and forming press being in horizontal section; Fig. 2 an elevation partly in section on the line indicated by 2 in Fig. 1, looking in the direction of the arrow, of the blanking and forming mechanism as seen from the right in Fig. 1, the assembling mechanism being omitted for the sake of clearness; Fig. 3 an elevation as seen from the left in Fig. 2 showing the guard forming mechanism and the assembling mechanism, the bed being in section; Figs. 3$^a$ and 3$^b$ detail views of a retaining plate detached; Fig. 4 a detail view illustrating means for operating the carrying wheel; Fig. 5 an elevation on an enlarged scale of a guard as received from the guard forming mechanism; Fig. 6 a view of the guard as seen from the right in Fig. 5; Fig. 7 an elevation of the assembling mechanism and the pin transfer mechanism as seen from the right in Fig. 1; Fig. 8 a detail sectional view of the pin transfer mechanism, corresponding with Fig. 7; Figs. 9 and 10 plan views on an enlarged scale illustrating the operation of transferring a pin from the pin forming mechanism to the assembling mechanism; Fig. 11 a plan view of the assembling mechanism; Fig. 12 an elevation partly in section corresponding with Fig. 11; Fig. 13 an end elevation of the assembling mechanism from a point of view indicated by the line 13 in Fig. 12; Figs. 14 and 15 detail views illustrating the assembling of a pin and guard, and Fig. 16 is a cross section of a completed pin on an enlarged scale showing the guard in elevation.

20 denotes the bed of the machine and 21 the driving shaft which receives power from a gear wheel 22 and from which all of the mechanisms of the machine are driven. This shaft carries a bevel pinion 23, cams 24, 25, 26, 27, 28, 29 and 30, a worm 31 and a crank disk 32. Bevel pinion 23 meshes with a bevel pinion 33 on a transverse shaft 34 which carries cams 35, 36 and 37, eccentrics 38 and 39 and a bevel pinion 40 which meshes with bevel pinion 41 on a shaft 42 which lies parallel with the driving shaft. Shaft 42 carries cams 43, 44, 45, 46, 47, 48 and 49.

*The pin making mechanism.*—This mechanism will not be described in detail as specifically it forms no portion of the present invention. It is considered sufficient for the purposes of this specification to state that the wire enters the machine on the line indicated by 50. The feed slide, indicated by 51, is reciprocated by means of a crank rod 52 operated by crank disk 32 on shaft 21. Jaws upon the feed slide grip the wire and feed a predetermined length which is just sufficient for the making of a pin. The wire now lies in notches in carrying disks 53 which receive step by step rotation through mechanism not shown actuated by worm 31. The instant the feeding movement ceases the wire is held by gripping mechanism indicated by 54 and operated by a lever 55 which is oscillated by cam 29.

56 indicates cut-off mechanism which is operated by cam 30. After each actuation of the cut-off mechanism the carrying disks move forward one step, each feeding and cut-off movement delivering a blank to the disks. As the disks move forward the blanks are carried under suitable retaining mechanism indicated by 57 and over the periphery of a wheel 58 by which they are rolled with their point ends in position to be acted upon by pointing cutters indicated by 59, the special driving connections not being shown. After each actuation of the carrying disks a pointed blank is removed therefrom and passed along guides 60 until it engages a vertically reciprocating arbor 61, see Fig. 1 in connection with Fig. 9. An instant later blank holding jaws 62 and 63 operated by cams 27 and 28 grip the blank, as clearly shown in Fig. 9. As soon as the blank is gripped an arm 64 operated from cam 26 forms the guard retaining bend 65 at the unpointed end of the blank and simultaneously, or approximately so, coiling mechanism (not shown) moves into operative position. The arbor is moved into and out of operative position by a lever 66 which is engaged by cam 48 on shaft 42 and the coiling mechanism is moved into and out of operative position by a lever 67 which engages a cam 47 on said shaft. The coiling mechanism is operated by a segment gear 68 which in turn is operated by a rack 69 carrying a roll engaging cam 49 on shaft 42. The function of the coiling mechanism is to produce the coil 70 which gives resiliency to the pointed arm of the completed pin. The arbor, the coiling mechanism and bending arm 64 now move out of operative position leaving the pin in the position shown in Fig. 9, the pointed arm of the pin lying between transfer jaws 71 and 72 which have moved to the position shown in Fig. 9 and are slightly opened as indicated by dotted lines in Fig. 7. It should be borne in mind that the blank holding jaws 62 and 63 operate in a vertical plane and the transfer jaws grip in the vertical plane and then swing in the horizontal plane and carry the blank to the assembling mechanism, as will presently be more fully explained.

*The transfer mechanism.*—The function of this mechanism is to transfer the completed pin from the pin making mechanism to a position in which the guard is assembled therewith and attached thereto. Turning now to Figs. 7 to 10 inclusive lower transfer jaw 72 has formed integral therewith a sleeve 73 which is adapted to oscillate on a stud 74 rigidly secured to the bed. The sleeve extends above the jaw and is provided with a slot 75 in which the upper transfer jaw 71 is pivoted. The sleeve and transfer jaws are shown as retained upon the stud by a shouldered screw 76, at the bottom of the slot, which engages the end of the stud leaving the sleeve and transfer jaws free to oscillate thereon in the horizontal plane.

77 denotes a pinion secured to the lower end of the sleeve.

Upper jaw 71 is provided with a downwardly extending arm 78 having a boss 79 adapted to be engaged by a cam 80 which is formed integral with or rigidly secured to a pinion 81, said cam and pinion being adapted to oscillate on the sleeve. Cam 80 is provided with inclines 86 and 87 separating high portion 88 from low portion 89. In the position shown in Fig. 9 boss 79 is in engagement with the low portion of the cam which permits arm 78 and the boss to swing inward either by gravity or the action of a spring, raising the upper jaw, as indicated by dotted lines in Fig. 7. Pinion 81 is oscillated to operate jaw 71 by means of a rack 82, the outer end of which is shaped to engage cam 46 on shaft 42, a spring 83 acting to retain the rack in engagement with the cam. Pinion 77 is oscillated to swing the transfer jaws from the position shown in Fig. 9 to that in Fig. 10, and vice versa, by means of a rack 84, the outer end of which is shaped to engage cam 45 on shaft 42, a spring 85 acting to retain the rack in engagement with the cam. Each reciprocation of rack 82 comprises three movements, which are imparted to pinion 81. From the normal position of the parts (not shown) rack 82 first moves half, more or less, of its forward movement, then there is a dwell, then the rack moves again and completes its forward movement, then there is another dwell, and then the rack returns to its normal position, thereby imparting two forward movements to pinion 81 and a return movement of said pinion to its normal position. The movement of rack 84, produced by cam 45, is simply a forward movement, a dwell and a return to the normal position. I have not illustrated cams 45 and 46 in detail as it is sufficient for the purposes of this specification to describe the movements produced by them.

For convenience in description of the operation of the transfer jaws I will start with said jaws in the position shown in Fig. 10, in which it is supposed that the transfer jaws have taken a completed pin from the blank holding jaws and transferred it to the assembling mechanism, presently to be described. The transfer jaws have been swung to this position by the forward movement of rack 84 and said rack is now stationary. In this position of rack 84 and the transfer jaws, rack 82 will have made the first of its forward movements and will be stationary. Rack 82 now makes its second forward movement, the effect of which is to carry cam 80 in the direction of the arrow in Fig. 10, causing boss 79 on upper transfer jaw 71 to drop down incline 86 to the low portion of the cam, the effect of which is to swing said upper jaw from the position in full lines in Figs. 7 and 8 to the position indicated by dotted lines in Fig. 7 and release the pin. The return movement of rack 84 now takes place, the effect of which is to swing the transfer jaws from the position shown in Fig. 10 to the position in Fig. 9. During this movement of rack 84 and the transfer jaws, rack 82 will also make its return movement in the reverse direction from the movement of the jaws. This will carry the cam from the position last referred to, in which boss 79 was in engagement with the low portion of the cam to the position shown in Fig. 9, boss 79 first riding up incline 86 and causing the jaws to close (which is an idle movement) and then riding down incline 87 leaving the jaws open again, (see dotted lines Fig. 7) and ready to receive the pointed arm of a completed pin held by the blank holding jaws between them. Rack 82 now makes its first forward movement and stops. This carries the cam from the position shown in Fig. 9 to the position in Fig. 10, boss 79 riding up incline 87 and onto the high portion of the cam, the effect of which is to swing the upper transfer jaw to the closing position; that is, from the position indicated by dotted lines in Fig. 7 to a position in which it grips the pin. Rack 84 now makes its forward movement and swings the transfer jaws, carrying the pin, from the position shown in Fig. 9 to the position in Fig. 10. At the commencement of this movement, boss 79, as already explained, is in engagement with the high portion of the cam and remains in engagement with said high portion during the entire transfer movement of the jaws. This movement leaves the pin in position to be taken care of by the assembling mechanism when released by the transfer jaws, which release is caused, as already explained, by the second forward movement of rack 82, which carries the cam forward in the direction of the arrow in Fig. 10 and causes boss 79 to ride down incline 86 to the low portion of the cam, which causes the upper jaw to swing to the position indicated by dotted lines in Fig. 7 and release the pin, after which the return movement of the jaws and the cam in opposite directions take place as before.

*The guard forming mechanism.*—Simultaneously with the movements of the pin forming mechanism and the transfer mechanism and timed in unison therewith, the guard forming mechanism is forming guards and delivering them to the assembling mechanism, presently to be described, where they are assembled with the pins and secured thereto.

90 denotes a strip of sheet metal from which the guards are formed and which may be coiled upon a drum 114. The strip is drawn into the machine by feed rolls 91 appearing only in dotted lines in Fig. 2. The shaft of the lower feed roll carries a ratchet 92 which is engaged by a pawl 93 carried by an arm 94 pivoted on said feed roll shaft and oscillated by means of an arm 95 which is connected to the strap 149 of eccentric 38 on shaft 34.

96 (see Fig. 1) denotes a hand wheel on the lower feed roll shaft for convenience in starting the strip into the machine. This hand wheel is removed in Fig. 2 to show the ratchet.

97 denotes the frame of an ordinary double acting press, 98 the blanking plunger, 99 the forming plunger, 100 the blanking punch, 101 the forming punch, 102 the blanking die, 103 the forming die, and 104 the stripper plate. The blanking plunger is operated by means of a lever 105, and the forming plunger by means of a lever 106.

107 denotes a rod pivoted to lever 106 and connected to the strap 108 of eccentric 39 on shaft 34. Lever 105 lies directly under lever 106, as seen in Fig. 1.

109 denotes a rod pivoted to lever 105 and having at its lower end a yoke 110 which straddles shaft 34 and carries a roller 111 (see dotted lines Figs. 1 and 2) which engages a groove in the face of cam 37 on said shaft.

Levers 105 and 106 are provided with rounded inner ends which are socketed in sliding blocks 112 and 113 in the blanking and forming plungers respectively. The forming plunger is recessed into the blanking plunger, as clearly shown in Fig. 1, and is retained in place therein by a face plate 115, also recessed into the face of the blanking plunger, and the blanking plunger is recessed into the frame of the press and retained therein by face plates 116.

The operation of the press is that of an ordinary double acting press. After each actuation of the feed rolls, the blanking punch, in coöperation with the blanking die, cuts out a guard blank from the strip, forces it through the blanking die and leaves it resting upon the forming die. The forming punch, in coöperation with the forming die, then forms the guard to the shape shown in Figs. 5 and 6, the guard being carried through the die. The punches then rise, the stripper plate acting to detach the strip from the blanking punch, and the forming die to strip the guard from the forming punch. The next actuation of the feed rolls then takes place and the punches operate as before to form another guard. The formed guards drop into radial slots 117 in a flange 118 which projects from one side of the periphery of carrying wheel 119. The guards are retained in the slots by a plate 120 having a curved retaining flange 121 lying under the flange of the carrying wheel (see Figs. 3ª and 3ᵇ in connection with Fig. 12). The shaft of the carrying wheel, indicated by 122, also carries a ratchet 123. Motion is imparted to the ratchet and carrying wheel by means of a spring controlled pawl 124 pivoted to an arm 125 mounted to oscillate on shaft 122.

126 denotes a rod pivoted to arm 125 and having at its opposite end a yoke 127 which straddles shaft 42 and carries a roller 128, which engages cam 43 on shaft 32 (see Fig. 4 in connection with Fig. 1).

It will be noted that the teeth of the ratchet correspond in number with the slots in the carrying wheel. The carrying wheel moves forward with a step by step movement and at each actuation places a blank lying in one of the slots in alinement with a guide 129 from which it is expelled by a finger 130 carried by a slide 131 which reciprocates in a block 132 secured to the bed. It will be understood from Fig. 12 that slide 131 does not contact with the carrying wheel and that finger 130 is shaped to lie within flange 118 and to pass through a slot therein and to carry the guard through the guide to the assembling die, as will presently be fully explained. Movement is imparted to the slide and the finger by means of a lever 133 pivoted to a bracket 134 which partly appears in Fig. 1 and whose position is indicated by dotted lines in Fig. 3, the bracket itself being nearer the point of view than the section line of the bed. This lever is provided with a slot 135 and its upper end passes through and has sliding engagement with the rear end of the slide. 136 denotes a second lever pivoted on a bracket 137, secured to the bed, and having at one end a pin 138 which engages the slot in lever 133. The other end of lever 136 carries a roll 139 which engages cam 44 on shaft 42, a spring 140 acting to retain the roll in engagement with the cam. It will be noted that each oscillation of lever 136 will produce a greatly increased movement of the upper end of lever 133 and the slide and finger.

*The assembling mechanism.*—As already explained, the completed guards are removed from the carrying wheel and are passed through guide 129 by finger 130. The guide is shown as consisting of corresponding grooves in the contiguous faces of two plates which are secured to each other and to a bracket 141 itself secured to the bed. From the forward end of the guide, the guards drop, in the position shown in Fig. 5, into assembling die 142 recessed into a slide 143 which is adapted to reciprocate in a block 144 secured to the bed. Movement is imparted to the slide and die by means of a lever 154 pivoted on the bed (see Figs. 1, 11 and 12) and having at its outer end a roll adapted to engage a groove in the periphery of cam 36 on shaft 34 and at its inner end a yoke 146 which lies in a slot 147 in the slide and straddles a pin 148 seated in the slide.

It has already been explained that the transfer mechanism carries the pin from the pin forming mechanism into a position to be taken care of by the assembling mechanism. The coil of the pin now lies in an angle in a retaining block 150 which is secured to a block 151 itself secured to the bed (see Figs. 11 and 12). In this position the coil is gripped by a contact piece 152 on a retaining lever 153 pivoted between ears 154 on block 151. Lever 153 is operated by means of cam 24 on shaft 21. The transfer jaws now release the pin, as already explained, and the jaws swing back to the pin forming mechanism to get another pin. The parts are now in the position shown in Figs. 11, 12 and 14. It will be noted that the forward end of slide 143 is provided with a recess 155 which is in alinement with the guard recess in the assembling die. Slide 143 now moves forward from the position shown in Fig. 14 to the position shown in Fig. 15, the guard retaining bend in the pin passing along recess 155 and into the guard. In this position of the slide, the guard is directly under assembling punch 156 which is carried by a slide 157 reciprocating in a frame 158 secured to the bed. The slide is operated by means of lever 159 pivoted to the frame and having a sliding pivotal connection with the slide. The rear end of the lever carries a roll 160 (see dotted lines Figs. 1 and 7) which engages a groove in the face of cam 35 on shaft 34. The function of the assembling punch is to swage the guard about the guard retaining bend in the pin, which secures the guard and pin rigidly together, and to close the sides of the guard together and form the central retaining lug, indicated by 165, as will be readily understood by comparing Fig. 14 with Figs. 15 and 16. The operation of the assembling punch completes the formation of the safety pin, but leaves the pointed arm of the pin disengaged from the guard, as in Fig. 15. The pin is closed, *i. e.* engaged with the guard, by means of an arm 161 which is carried by a vertical shaft 162 socketed in block 151 and carrying a pinion 163 which is engaged by a rack 164 recessed in the block and actuated by means of cam 25 on shaft 21. It will be understood from Fig. 16 that the two arms of the pin normally lie in the same plane and that the guard is made wide enough to permit the pointed arm to be passed in from either side of the retaining lug in use. The instant the assembling punch is out of the way, arm 161 swings toward the left, as seen in Fig. 15, and moves the pointed arm of the pin inward over the top of the beveled portion of the slide 143. When the arm of the pin reaches the edge of the guard it will be forced by arm 161 to ride up the curved outer surface of the guard and will be raised and swung slightly out of its normal plane. The instant, however, that it passes the portion of the inner edge of the guard indicated by 166, its own resiliency will cause it to swing back into its normal plane and it will slide down the retaining lug and into the pocket of the guard, as clearly shown in Fig. 16. An instant later the slide and assembling die move backward and the retaining lever rises and releases the pin, which will drop by gravity through an opening 167 in block 144 and the bed.

The operation of the machine as a whole has been so fully described in the description of the parts that further description is hardly necessary. Briefly, each actuation of the machine produces a complete safety pin. The pin making mechanism feeds wire, cuts off a blank, makes the coil, points the end of one arm and makes the guard retaining bend at the end of the other arm. The transfer jaws take the pin from the pin making mechanism and transfer it to a position to receive the guard. The coil of the pin is then gripped and the transfer jaws release it and return for another pin. Simultaneously with the making of a pin, the guard forming mechanism blanks out and forms a guard from sheet metal and places it in a slide which then moves forward and places the guard in position on the arm of the pin having the bend. The guard now lies over the assembling die and under the assembling punch which descends and swages the guard about the guard retaining bend, securing it rigidly to the pin and also closing the sides of the guard together to form the central retaining lug. While the completed pin is still held an arm engages the pointed arm of the pin and swings it into engagement with the guard. The pin is now released and drops through an opening in the bed of the machine. The four operations of making a pin, forming a guard, transferring a pin and assembling a pin and a guard are taking place simultaneously while the machine is in operation.

Having thus described my invention I claim:—

1. In a machine for making safety pins, an assembling mechanism including a carrying wheel having a radially slotted flange and a retaining plate lying under the flange by which the guards are retained in the slots in carrying the guards from the forming mechanism to the assembling die.

2. In a machine for making safety pins, an assembling mechanism including a carrying wheel having slots which receive the guards from the forming mechanism, means for imparting a step by step movement to the carrying wheel, a guide in the assembling mechanism in alinement with one of the slots when the wheel is at rest, and a reciprocating finger by which the guards are carried from the slots and through the guides.

3. In a machine for making safety pins, an assembling mechanism including a slotted carrying wheel for the guards, a finger by which the guards are expelled from the wheel, a slide by which the finger is carried, a lever, one end of which engages the slide and the other end a pivoted stud, a slot in said lever intermediate the pivot and the slide, a second lever whose long arm is provided with a pin engaging the slot, and means for oscillating said lever to impart increased movement to the slide and finger.

4. In a machine for making safety pins, assembling mechanism including a reciprocating slide having a recessed die portion, a carrying wheel having slots which receive the guards from the forming mechanism, means for imparting a step by step movement to the carrying wheel, a guide on the reciprocating slide in alinement with one of the slots when the wheel is at rest, and a reciprocating finger by which the guards are carried from the slots, through the guide and delivered to the recessed die on the slide.

5. In a machine for making safety pins, an assembling mechanism, and means for transferring the formed pins and guards to the assembling mechanism, a reciprocating assembling slide having a recessed die to which the guards are delivered and a beveled edge adjacent thereto, a stationary retaining block having an angle to receive the coil of the pin, means for holding the pin thereon with one arm in alinement with the recessed die and the pointed arm in alinement with the beveled portion of the slide, and an oscillating horizontal finger mounted upon the retaining block adapted to engage the pointed arm and cause it to ride up over the beveled portion of the slide and engage the assembled head.

In testimony whereof I affix my signature in presence of two witnesses.

EDWIN S. INGRAHAM.

Witnesses:
H. G. THEURER,
O. L. DIBBLE.